(12) United States Patent
Li

(10) Patent No.: US 6,463,186 B1
(45) Date of Patent: Oct. 8, 2002

(54) MAGNETICALLY CONTROLLED OPTICAL SWITCH AND OPTICAL ATTENUATOR

(75) Inventor: Yi-Qun Li, Orinda, CA (US)

(73) Assignee: Intematix Corporation, Moraga, CA (US)

( * ) Notice: Subject to any disclaimer, the term of this patent is extended or adjusted under 35 U.S.C. 154(b) by 29 days.

(21) Appl. No.: 09/684,283

(22) Filed: Oct. 6, 2000

(51) Int. Cl.⁷ .............................. G02F 1/295; G01B 9/02
(52) U.S. Cl. ................................ 385/6; 385/15; 385/16; 385/39; 385/40; 385/140; 356/450
(58) Field of Search ................ 385/39, 27, 6, 385/16, 15, 53, 57, 40, 41, 12, 140; 356/450, 473

(56) References Cited

U.S. PATENT DOCUMENTS

| | | | | |
|---|---|---|---|---|
| 4,376,248 A | * | 3/1983 | Giallorenzi et al. | 250/227 |
| 4,378,497 A | * | 3/1983 | Giallorenzi | 250/227.19 |
| 4,433,291 A | * | 2/1984 | Yariv et al. | 250/227.19 |
| 4,471,219 A | * | 9/1984 | Giallorenzi | 250/227 |
| 4,587,487 A | * | 5/1986 | Zanzucchi | 324/244.1 |
| 4,591,786 A | * | 5/1986 | Koo et al. | 324/244.1 |
| 4,609,871 A | * | 9/1986 | Bobb | 250/227.19 |
| 4,712,065 A | * | 12/1987 | Pitt et al. | 324/244 |
| 5,305,075 A | * | 4/1994 | Bucholtz et al. | 250/227.19 |

* cited by examiner

Primary Examiner—Brian Healy
(74) Attorney, Agent, or Firm—John F. Schipper

(57) ABSTRACT

System and method for attenuation of light or optical switching of light, or a portion thereof, from a first optical fiber to a second optical fiber in a relatively short time interval. Two fibers are physically coupled over a length that is equal to an initial optical coupling length, where full transfer of light energy can occur from the second fiber to the first fiber. The physical coupling region of the fibers is immersed in a magnetostrictive material upon which a magnetic induction of controllable strength is impressed. When the magnetic induction is changed from a first selected value to a second selected value, optical switching or optical attenuation occurs between the fibers or in a single fiber. The optical coupling apparatus may include a Mach-Zehnder interferometer and may include first and second magnetostrictive materials in the first and second arms, respectively, of the interferometer. The magnetostrictive material(s) and/or the interferometer may be temperature-controlled to provide improved control of these components.

25 Claims, 5 Drawing Sheets

MAGNETICALLY CONTROLLED OPTICAL SWITCH AND OPTICAL ATTENUATOR

FIELD OF THE INVENTION

This invention relates to optical switches and optical attenuators.

BACKGROUND OF THE INVENTION

In fiber optical communication systems in use today, couplers split optical signals into multiple paths or combine signals for transmission over one path. Two fibers, each considered as an optical waveguide, are pressed closely together so that energy that leaves one fiber is, for the most part, captured and used by the other (contiguous) fiber. Assuming that no energy is lost within a fiber due to Fresnel transmission through the boundary (due to absence of total internal reflection within the fiber), a small amount of optical energy can escape form the fiber in the form of an evanescent wave, which has an amplitude that decays very rapidly with increasing distance from the fiber boundary. A fiber coupler seeks to capture this evanescent wave energy emitted by a first fiber in a contiguous second fiber. Because the evanescent energy is the same fraction of the total optical energy available at a separation gap of width $D_g$ between the two fibers, over a characteristic optical coupling length or distance $L_c$, substantially all energy from the first fiber can be coupled into the second fiber. Over a second (consecutive) characteristic distance $L_c$, the energy coupled into the second fiber will return to the first fiber by the same mechanism. The coupling length $L_c$ varies with wavelength and with the dimensions and refractive indices of the fiber and of the ambient medium. FIG. 1 illustrates how optical energy, initially present in a first fiber 11, is progressively coupled into a second contiguous fiber 12 over a first distance $L_c$ and is then progressively coupled back into the first fiber over a second distance $L_c$. In many circumstances, it is difficult to control the relative amounts of light appearing in each of the first fiber and the second fiber beyond the coupling region shown in FIG. 1.

A single mode thermo-optic switch, disclosed recently by Photonic Integration Research, uses a modified Mach-Zehnder interferometer with equal (rather than unequal) fiber lengths between two fiber couplers that define the interferometer and provides a thin film heater adjacent to the fiber in one arm. When the heater is activated, the change in fiber temperature causes a change in refractive index of the heated fiber, which changes the effective length of the heated fiber and causes interference between light beams propagating in the two interferometer arms. The apparatus behaves as a wavelength switch for light, but with rather slow reactions, requiring switching times that are estimated to be seconds or tens of seconds.

What is needed is an approach that allows the relative amounts of light appearing in each of the first and second fibers at a selected wavelength beyond the coupling region to be controlled so that, if desired, all light appears in a selected one of the first and second fibers. Preferably, this approach should allow the relative amounts of light appearing in each fiber to be changed slowly and continuously, if desired, or to be changed abruptly. Preferably, this approach should be applicable to any wavelength within a selected range. Preferably, this approach should not require a substantial increase in the volume occupied by the apparatus vis-a-vis the volume occupied by the fibers and light source. Preferably, a reaction time for switching or attenuating light with a selected wavelength should be a small fraction of a second.

SUMMARY OF THE INVENTION

These needs are met by the invention, which provides a first approach for magnetically controlling the optical coupling length $L_c$ through use of a magnetostrictive (MS) material that changes its optical coupling length $L_c$, its gap width $D_g$ and/or the refractive indices of the two fibers within the coupling length $L_c$, in response to a change in strength of a magnetic induction field impressed on the material. This approach is applied to provide an optical switch or optical attenuator in which light propagating in a first optical fiber is switched on, switched off or attenuated by application of a magnetic induction of appropriate strength and orientation to the fiber.

In a second approach, a Mach-Zehnder interferometer (MZI) is provided for a pair of fibers or channels, with a first fiber, but not a second fiber, including a magnetostrictive element and the two fibers being subsequently coupled using a standard fiber coupler. An MZI includes first and second fibers extending between a first fiber coupler and a second fiber coupler, spaced apart, with the two fiber lengths between the couplers being different by a selected length difference, with the coupling coefficients preferably being 50 percent at each coupler. Light propagating in, say, the first fiber (or second fiber) may be fully transmitted, partly transmitted or blocked, depending upon the length difference, the refractive indices of the fibers and the light wavelength. When a magnetic field impressed on the magnetostrictive element is changed, transmission or blockage of light at the second coupler is changed. A second magnetostrictive element, having the same MS material or, preferably, another MS material with different characteristics, is optionally positioned in an MZI arm including the second fiber, to provide additional control over the change in refractive index and/or physical length of the first and second MS elements.

Optionally, the system used in the first approach and/or in the second approach is positioned within a temperature control module to provide improved control over the MS characteristics of the system.

DESCRIPTION OF BEST MODES OF THE INVENTION

Figure 1:
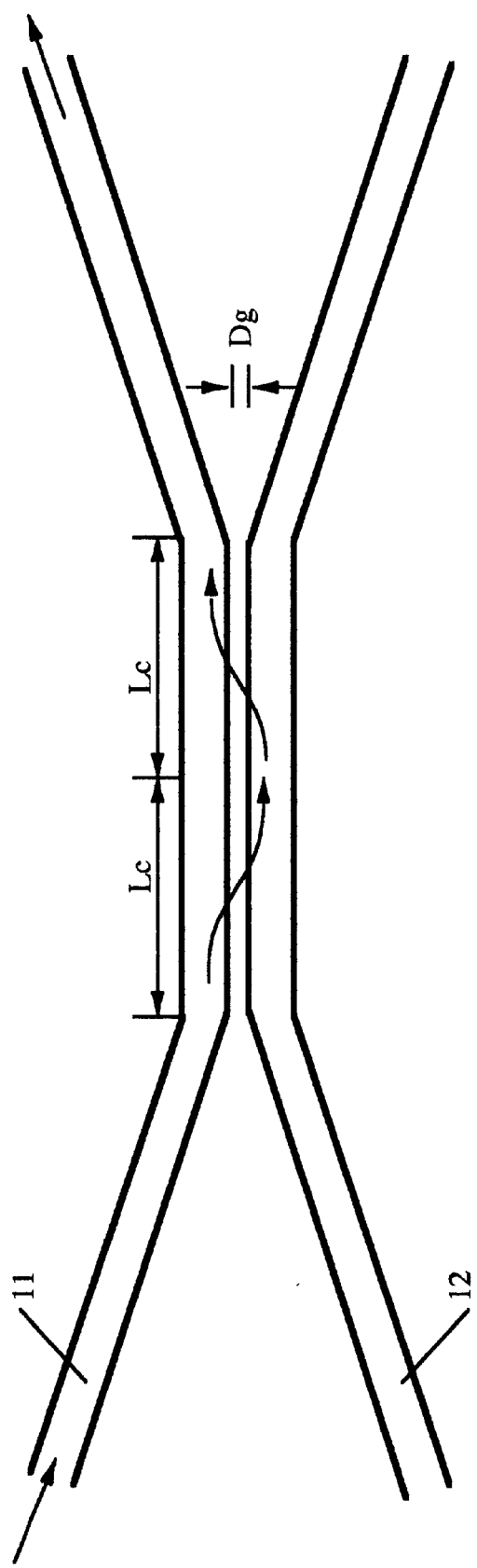
FIG. 1 illustrates coupling of energy between first and second contiguous fibers over two consecutive optical coupling lengths $L_c$.
Figure 2:
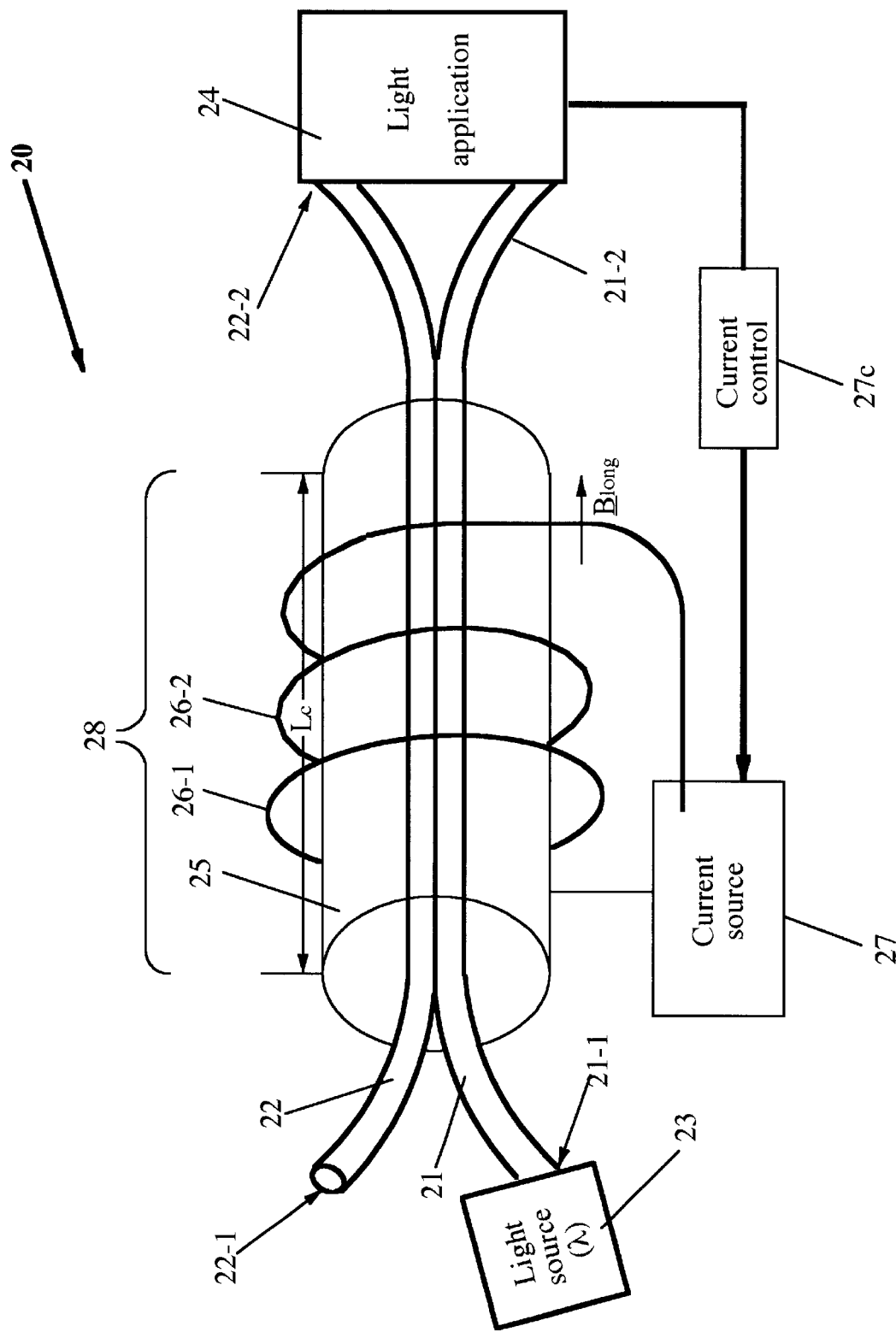
FIGS. 2 and 3 illustrate two embodiments using magnetostrictive activity to control the length $L_c$ for coupling between first and second contiguous fibers.

FIG. 2 illustrates a first embodiment 20 of the invention, wherein a first fiber 21 and a second fiber 22 are physically coupled together in a physical coupling region 28. An input end 21-1 of the first fiber 21 receives light from a light source 23 having a selected wavelength component with a selected wavelength λ. At least one of the output ends, 21-2 and 22-2, of the first and second fibers is connected to a light application device 24 to receive light from the light source 23. A tube 25, which may be cylindrical, of magnetostrictive (MS) material is positioned contiguous to and surrounding the fibers, 21 and 22, in the physical coupling region 28 to firmly press the fibers together. A coil or sequence of current carrying lines 26-i (i=1, 2, . . . ), fed by a controllable current source 27, is provided adjacent to the magnetostrictive tube 25 in a circumferential or transverse direction to impress a longitudinally oriented magnetic induction B with controllable induction strength on the magnetostrictive material.

A magnetostrictive (MS) material belongs to a special class of materials that responds to change in an ambient magnetic field by a change in its optical coupling length $L_c$, in its gap width $D_g$ and/or in the refractive indices of the material (two fibers) within the coupling length $L_c$. Many MS materials manifest a fractional change in length in a selected direction of the order of $10-100 \times 10^{-6}$. One of the most attractive MS materials is iron-cobalt alloy, $Fe_aCo_{1-a}$, with $0 \leq a \leq 1$, which has a saturation magnetostriction parameter of between $10 \times 10^{-6}$ and $120 \times 10^{-6}$. Other attractive magnetostrictive materials include Co, Ni, $Fe_bNi_{1-b}$, $(Tb_cDy_{1-c})Fe_2$, $TbFe_2$, $Fe_{0.8}B_{0.2}$, $Fe_{0.4}Ni_{0.4}B_{0.2}$, ceramics of $Fe_3O_4$, $Fe_2NiO_4$, and $Fe_2CoO_4$, and metallic glasses of FeSiB and (FeNi)SiB, with $0 \leq b,c \leq 1$. These materials are generally magnetically soft so that a small electrical current is usually needed to drive the magnetostrictive action.

As the impressed longitudinal magnetic induction strength $B_{long}$ is changed from a first value $B_{long,1}$ (e.g., 0 Gauss) to a second value $B_{long,2}$ (e.g., 1 Gauss or 10 Gauss or 100 Gauss), the length $L_c$ of the optical coupling region changes from $L_c(B_{long,1})$ to $L_c(B_{long,2})$, in response to change in length of the contiguous tube 25. The optical coupling length $L_c(\lambda,n1,n)$ may change by about 10–120 ppm, in response to change of the magnetic induction strength.

In a first version of this embodiment, the first fiber 21 and the second fiber 22 are physically coupled together in the region 28 over a physical coupling length $L_p$ that is initially substantially equal to the optical coupling length $L_c(\lambda,n1,n)$ of the fibers for light of wavelength $\lambda$, when the first magnetic induction strength $B_{long,1}$ satisfies $$L_c(B_{long,1})=L_c(\lambda,n1,n)=L_p. \quad (1)$$

Here, n1 and n are the refractive indices of the fiber core and the ambient medium, respectively, and these indices may vary weakly with wavelength of the light. In this version, substantially all light in the first fiber 21 is coupled into the second fiber 22 over the optical coupling region 28 for the initial induction strength $B_{long,1}$, and substantially no light appears initially in the first fiber at the light application device 24.

As the impressed magnetic induction strength changes to $B_{long,2}$, the optical coupling length changes from $L_c(B_{long,1})$ to $L_c(B_{long,2})$, and this latter length value is now substantially different from (substantially greater than or substantially less than) the initial optical coupling length $L_c(\lambda,n1,n)$. A fraction of the light that has been coupled into the second fiber 22 is recoupled into (or is not coupled from) the first fiber 21, because $$L_c(B_{long,2}) \neq L_c(\lambda,n1,n). \quad (2)$$

A fiber refractive index may also change, for example, through a stress associated with the a mismatch in the elastic strains induced in the magnetostrictive and fiber materials.

A fraction, depending upon the magnetostrictive material used and the induction strengths $B_{long,1}$ and $B_{long,2}$, of the light that would have been carried by the second fiber 22 beyond the physical coupling region 28 now appears in the first fiber 21 at the light application device 24, through partial "spoiling" of the complete transfer of light to the second fiber 22. The system 20 shown in FIG. 2 behaves as an optical switch.

In order to switch 100 percent of the light from a first fiber to a second fiber, the optical coupling length $L_c$ must be increased (or decreased) by one-half of a wavelength, which is 0.775 $\mu$m for a wavelength of $\lambda=1.55$ $\mu$m. If the magnetostrictive material $Fe_2CoO_4$, with $ms=100 \times 10^{-6}$, is used for a tube enclosing the first and second optical fibers, the required tube length is 7.750 mm. The current required to reach saturation magnetostriction is 10–50 milliamps with 500 turns of coil, which will produce a magnetic field strength of about 10 Oersteds.

The system illustrated in FIG. 2 can also serve as an optical attenuator. The electrical current provided by the current source 27, and thus the magnetic field impressed upon the magnetostrictive tube 25, may be varied to provide a change in physical coupling length that is a controllable fraction of $\lambda/2$ so that the light intensity in one of the first and second fibers, 21 and 22, varies continuously from zero intensity to maximum intensity. This approach permits the light intensity to be controlled through control of the current source 27. Control of the current source may be implemented in an open loop manner (no feedback) or may be implemented by providing a control module 27C that receives a signal representing light intensity received from the second fiber at the light application device 24 and adjusts the current source to achieve a desired light intensity, through closed loop feedback.

Figure 3:
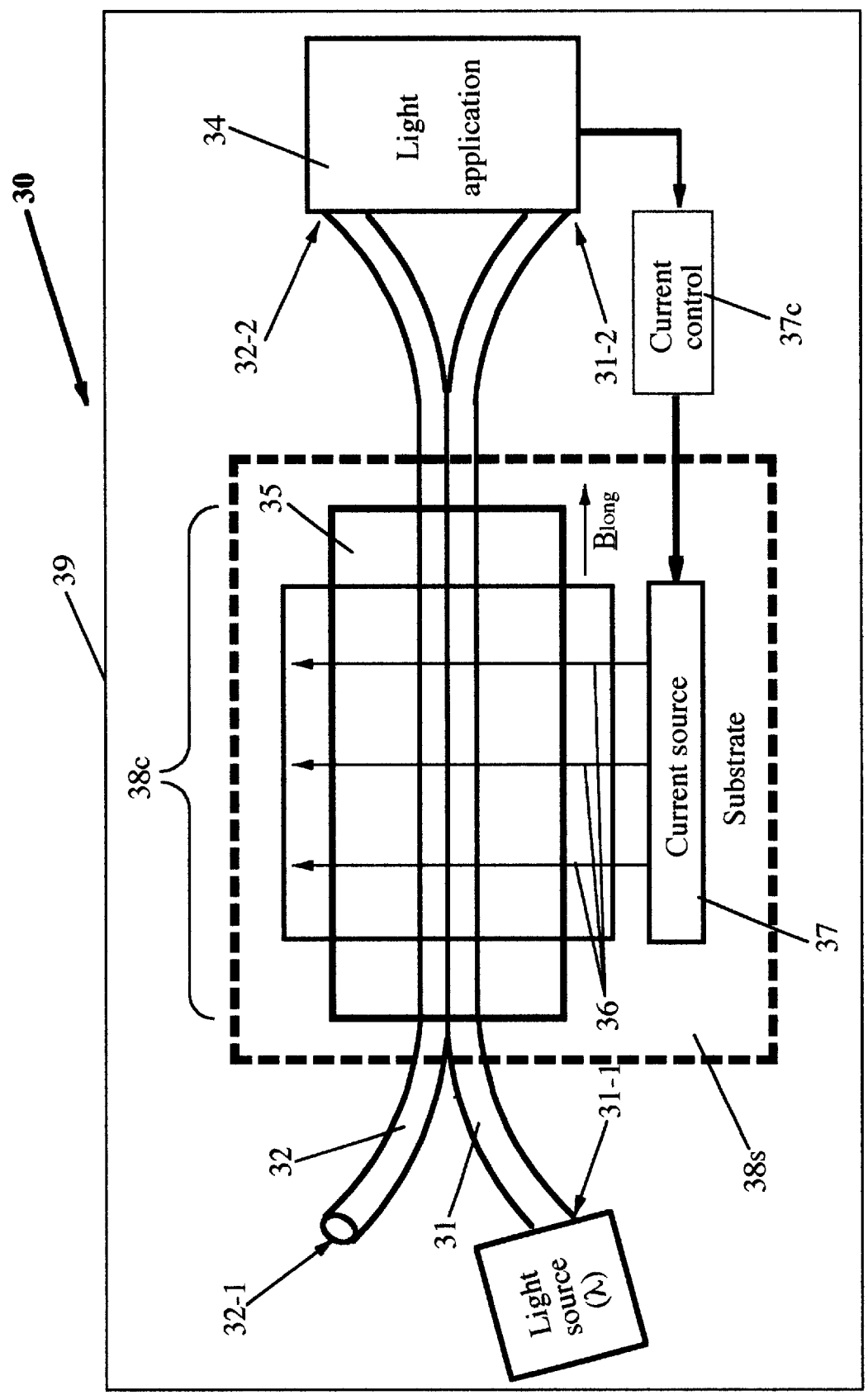

In a second embodiment 30 of the invention, illustrated in FIG. 3, first and second optical fibers, 31 and 32, are physically coupled over a physical coupling region 38c in a waveguide on a substrate 38s that is preferably constructed from $SiO_x$ on Si or on other substrates. The fibers, 31 and 32, in the physical coupling region 38 are surrounded by a contiguous region 35 of magnetostrictive material. A conductive strip, sequence of current-carrying lines or other means 36 with an associated current source 37, to impress a magnetic induction in a selected direction across the magnetostrictive region 35. A light application device 34 is connected to at least one of the output ends, 31-2 and 32-2, of the fibers, 31 and 32, to receive light delivered in one or both of these fibers.

Operation of the system 30 is similar to operation of the system 20. With an initial magnetic induction strength $B_{long,1}$ impressed on the magnetostrictive region 35, the physical coupling length $L_p$ and the optical coupling length $L_c(B_{long,1})$ are substantially equal and Eq. (1) applies. With a selected second magnetic induction strength $B_{long,2}$) impressed on the magnetostrictive region 35, the new optical coupling length $L_c(B_{long,2})$ is no longer equal to the physical coupling length $L_p$, and Eq. (2) applies. Full coupling of the light into the second fiber 32 is now partially "spoiled", and a portion of this light now appears in the first fiber 31 at the light application device 34.

Some MS materials manifest substantial temperature sensitivity. The system 20 in FIG. 2 and/or 30 in FIG. 3 optionally includes a temperature control module (shown as 39 in FIG. 3), surrounding at least the MS material and optionally other components of the system, to control the temperature of the MS material (and related components) to within 1–3° C., and preferably to within 0.5° C.

The system 30 can also serve as an optical attenuator, through open loop or closed loop control of the current source 37, in a manner similar to that discussed in connection with the system 20 in FIG. 2. Where automatic control of the current source 37 is desired, a current control module 37C is provided that receives a signal representing light intensity received at the light application device 34 and adjusts the current source to achieve a desired light intensity, through closed loop feedback.

Figure 4:
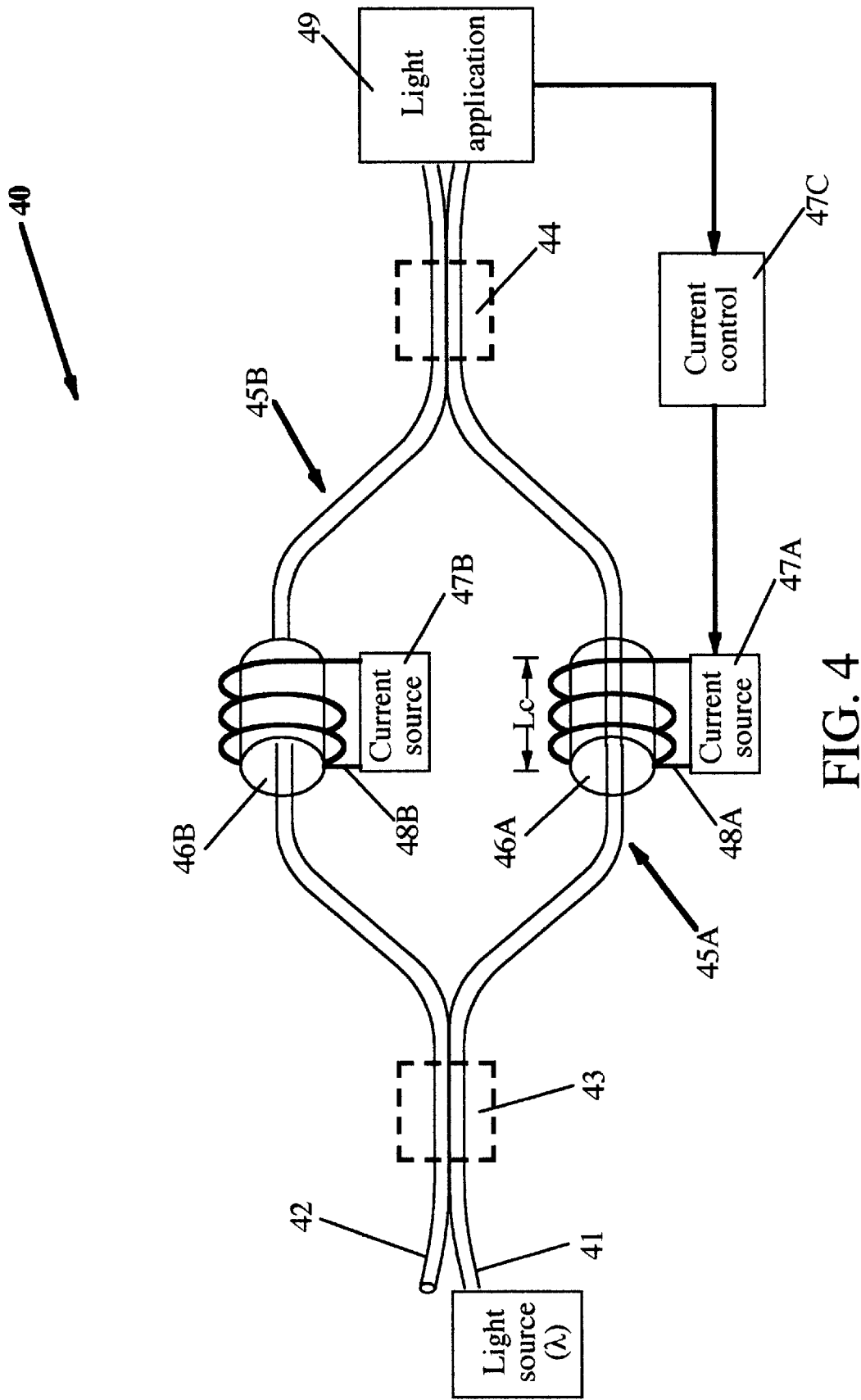
FIGS. 4 and 5 illustrate two embodiments using magnetostrictive activity in a modified Mach-Zehnder interferometer device to control coupling between first and second fibers.

In a third embodiment 40 of the invention, shown in FIG. 4, two optical fibers, 41 and 42, are assembled as a Mach-Zehnder interferometer ("MZI"), defined by first and second fiber couplers, 43 and 44, each of which is preferably a 3 dB coupler so that 50 percent of the incident light in the first fiber 41 is coupled into the second fiber 42 at the first fiber coupler 43. A light application device 49 is connected to an output end of at least one of the first and second fibers, 41 and 42.

As illustrated in FIG. 4, an MZI has two arms, 45A and 45B, of unequal lengths, L1 and L2, respectively, with refractive index n. Each arm is defined by first and second 3 dB optical fiber couplers, 43 and 44, arranged serially. The initial part of each arm, 45A and 45B, immediately following a first fiber coupler 43, carries an equal energy portion of a single light beam. However, because of the length difference, or equivalent time delay $$\tau = n \cdot (L_2 - L_1)/c, \tag{3}$$

interference occurs at the second fiber coupler 44, resulting in transmission of light in the first and second fibers beyond the second fiber coupler with transmissivity factors of $$T1(f\tau) = \{1 - \cos(2\pi f\tau)\}/2 = \sin^2(\pi f\tau), \tag{4}$$

$$T2(f\tau) = \{1 - \cos(2\pi f\tau)\}/2 = \cos^2(\pi f\tau), \tag{5}$$

$$f = c/n\lambda, \tag{6}$$

where f is the frequency of a particular wavelength included in the incident light. For frequencies near $$f = f(\text{pass}) = m/\tau (m=1, 2, 3, \ldots), \tag{7}$$

that frequency or wavelength component is passed by the second fiber coupler 44 with no loss or a small transmissivity loss and is extinguished (almost) completely by the first fiber. For frequencies near $$f = f(\text{exiting}) = (m+0.5)/\tau (m=0, 1, 2, 3, \ldots), \tag{8}$$

that frequency or wavelength component is extinguished by the second fiber coupler 44 substantially completely and is passed by the first fiber coupler 44 with no loss or a small transmissivity loss. The full width at half maximum (FWHM) for this filter is $$\Delta f = FWHM = \frac{1}{2}\tau. \tag{9}$$

A lightwave, traveling in one or both of the fibers, 41 and 42, should have a narrow band $\Delta\lambda$ of wavelengths (e.g., $\Delta\lambda \leq n1 \cdot (L_2-L_1)/R$ with R=5–1000)), with each fiber passing different wavelength components.

In the embodiment 40 in FIG. 4, a magnetostrictive tube or element 46A, contiguous to the first fiber 4, a current source 47A and current-conducting strip or coil 48A are positioned in the first arm 45A of the MZI, between the first and second fiber couplers, 43 and 44. Quasi-monochromatic light having a narrow wavelength component centered at a wavelength $\lambda 1$ is introduced into the first fiber 41 and is coupled into the second fiber 42 by the first fiber coupler 43. When a first magnetic induction B1 (e.g., 0–1 Gauss) is applied to the magnetostrictive tube 46A, the relative time delay $\tau 1$ for the two arms of the MZI satisfies $$\tau_1 = m/f = m \cdot n_1 \cdot \lambda_1/c (m=0, 1, 2, 3, \ldots), \tag{10}$$

so that the transmissivity T1 at the second fiber coupler 44 is substantially 100 percent. In this situation, substantially all light is received at the two fibers, 41 and 42, beyond the second fiber coupler 44.

When a selected second magnetic induction B2 (e.g., 1 Gauss or 10 Gauss or 100 Gauss) is applied to the magnetostrictive tube 46A, the first fiber 41 experiences a change in optical coupling length $L_c$, and the relative time delay $\tau 2$ for the two arms of the MZI satisfies $$\tau_2 = m/f = (m+0.5) \cdot n_1 \cdot \lambda_1/c (m=0, 1, 2, 3, \ldots), \tag{11}$$

and the transmissivity T2 at the second fiber coupler drops to substantially 0. The situations can be reversed, with the transmissivities satisfying T1=0 and T2=1. In either situation, the system 40 behaves as an optical switch for narrowband light introduced into the first fiber, or into the second fiber, and received at a light application device 49. Where the first arm 45A includes first and second arm components with fiber lengths $L_{1,1}$ and $L_{1,2}$, respectively, with the respective refractive indices $n_{1,1}$ and $n_{1,2}$, the time delay in Eq. (3) is replaced by $$\tau = (n_2 \cdot L_2 - n_{1,1} \cdot L_{1,1} - n_{1,2} \cdot L_{1,2})/c, \tag{12}$$

where n2 is the refractive index of the fiber in the second arm 45B

The system illustrated in FIG. 4 can also serve as an optical attenuator. The electrical current provided by the current source 47A, and thus the magnetic field impressed upon the magnetostrictive tube 46A, may be varied to provide a change in the relative time delay $\tau$ that is a controllable fraction of the FWHM so that the light intensity in one of the first and second fibers, 41 and 42, varies continuously from zero intensity to maximum intensity. This approach permits the light intensity to be controlled through control of the current source 47A. Control of the current source may be implemented in an open loop manner (no feedback) or may be implemented by providing a control module 47C that receives a signal representing light intensity received at the light application device 49 and adjusts the current source to achieve a desired light intensity, through closed loop feedback. If the change in optical coupling length $L_c$ is $\chi \cdot \lambda/2$, where $\chi$ is a selected fraction (e.g., k<$\chi$<k+1, with k=0, ±1, ±2, ±3, etc.), the attenuation will vary controllably with the fraction $\chi$.

Optionally, the second arm 45B of the system 40 in FIG. 4 includes a second magnetostrictive tube or element 46B, a second current source 47B (which may, but need not, coincide with the first current source 47A) and a second current-conducting coil or strip 48B. Each of the two arms, 45A and 45B, of the MZI manifests MS action when one or both of the current sources, 47A and 47B, is activated. Preferably, the MS materials used in the first and second magnetostrictive elements, 46A and 46B, have one or more different characteristics so that these two elements can be controlled individually or cooperatively to enhance the MS action. For example, the magnetostrictive materials used in the first and second elements, 46A and 46B, may be $Fe_aCo_{1-a}$ ($0 \leq a \leq 1$) and Ni, which have positive and negative MS coefficients, respectively, so that interference of the light beams from the arms, 45A and 45B, combined in the second coupler 44 is enhanced or made stronger. Alternatively, the MS materials used in the first and second elements, 46A and 46B, may have the same characteristics, but the first and second current sources, 47A and 47B, may be driven independently.

Figure 5:
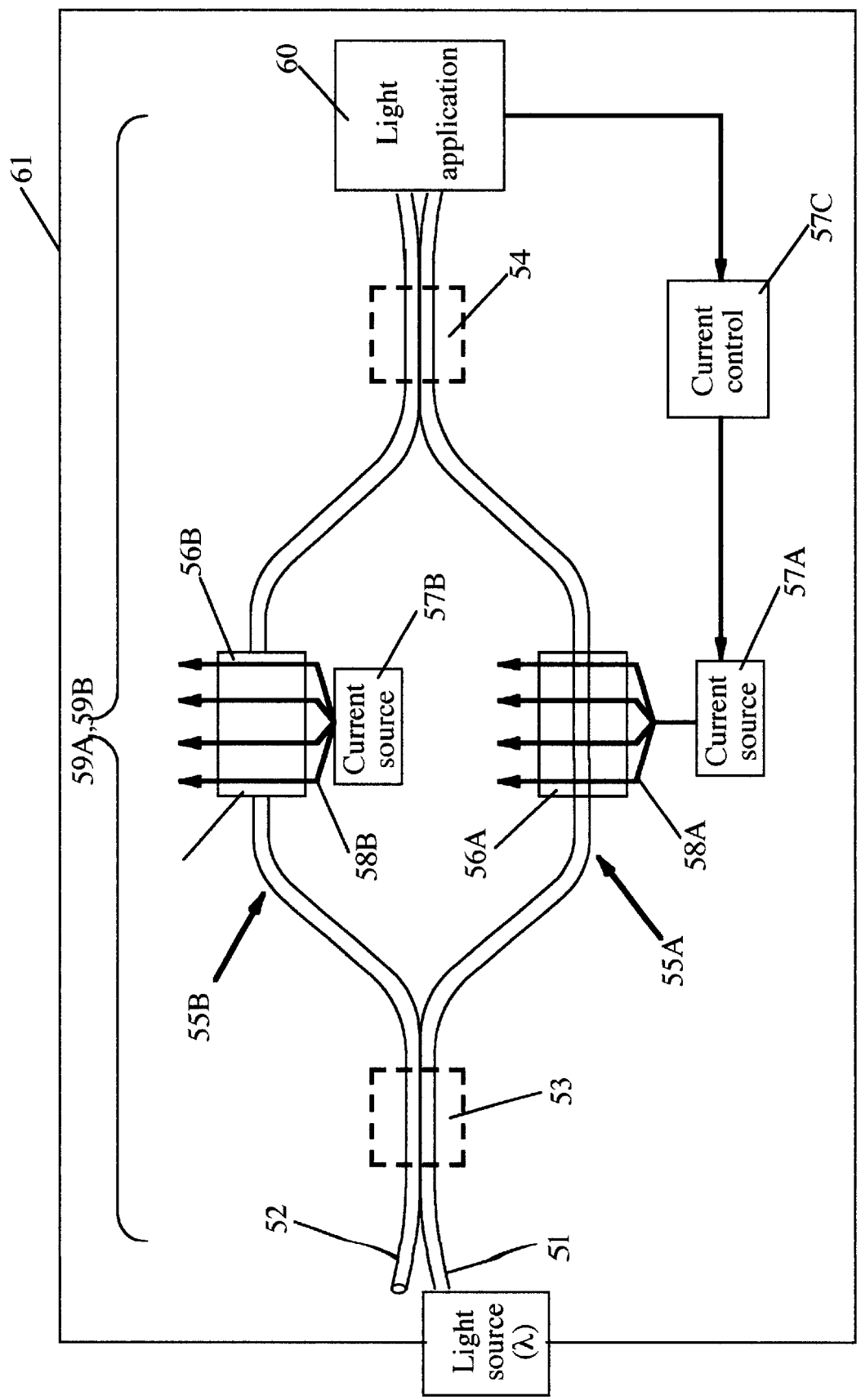

In a fourth embodiment 50 of the invention, illustrated in FIG. 5, first and second optical fibers, 51 and 52, are physically coupled through an MZI, defined by first and second fiber couplers, 53 and 54, constructed as part of a waveguide 59A on a substrate 59B that is preferably constructed from $SiO_x$ on Si or on other substrates. The fibers, 51 and 52, in the MZI are surrounded by a contiguous region 56 of magnetostrictive material. A conductive strip, sequence of current-carrying lines or other means 58A with an associated current source 57A, to impress a selected magnetic induction B in a selected direction across the magnetostrictive region 56A in the first arm 55A. A light application device 60 is connected to an output end of at least one of the first and second, 51 and 52, to receive light delivered in one or both of these fibers. Operation of the embodiment 50 is similar to operation of the embodiment 40.

The system 50 can also serve as an optical attenuator, through open loop or closed loop control of the current source 57, in a manner similar to that discussed in connection with the system 40 in FIG. 4. Where automatic control of the current source 57 is desired, a current control module 57C is provided that receives a signal representing light intensity received at the light application device 59 and adjusts the current source to achieve a desired light intensity, through closed loop feedback.

Optionally, the second arm 55B of the system 50 in FIG. 5 includes a second magnetostrictive tube or element 56B, a second current source 57B (which may, but need not, coincide with the first current source 57A) and a second current-conducting coil or strip 58B. Each of the two arms, 55A and 55B, of the MZI manifests MS action when one or both of the current sources, 57A and 57B, is activated. Preferably, the MS materials used in the first and second magnetostrictive elements, 56A and 56B, have one or more different characteristics (e.g., positive and negative MS coefficients) so that these two elements can be controlled individually or cooperatively to enhance the MS action, analogous to the situation for the system 40 in FIG. 4. Alternatively, the MS materials used in the first and second elements, 56A and 56B, may have the same characteristics, but the first and second current sources, 57A and 57B, may be driven independently.

The system 40 in FIG. 4 and/or 50 in FIG. 5 optionally includes a temperature control module (shown as 61 in FIG. 5), surrounding at least the MS element(s) and the MZI, and optionally other components of the system, to control the temperature of the MS material and of the MZI (and of related components) to within 1–3° C., and preferably to within 0.5° C.

Reaction time for optical switching or attenuation is a sum of time required to switch current and to establish a magnetic field in the ms material and is estimated to be of the order of μsecs to msecs.

What is claimed is:

1. An optical system for controlling light, the system comprising:
    first and second optical fibers that are physically coupled together as part of a Mach-Zehnder interferometer, having a selected length $L_c$, each fiber having a first end and a second end;
    a source of light including light with a selected wavelength λ, connected to the first end of the first fiber;
    a first control structure and a second control structure, surrounding and contiguous to the first and second fibers, respectively, in the optical coupling region, the first and second control structures including respective first and second magnetostrictive materials; and
    magnetic field means for impressing a first magnetic field of controllable induction strength on the first magnetostrictive material so that, when the impressed induction has a first selected value, a first selected amount of light is received at the second end of the first fiber, and when the impressed induction has a second selected value, a second selected amount of light is received at the second end of the first fiber, and for impressing a second magnetic field of a second controllable induction strength on the second magnetostrictive material so that, when the second impressed induction has a first selected value, a first selected amount of light is received at the second end of the second fiber, and when the second impressed induction has a second selected value, a second selected amount of light is received at the second end of the second fiber,
    wherein one of the first magnetostrictive material and the second magnetostrictive material has a positive magnetostrictive coefficient and the other of the first magnetostrictive material and the second magnetostrictive material has a negative magnetostrictive coefficient.

2. The system of claim 1, wherein said first selected amount of light is substantially no light.

3. The system of claim 1, wherein at least one of said first selected amount of light and said second selected amount of light is light is no larger than a selected threshold amount.

4. The system of claim 1, wherein at least one of said first selected amount of light and said second selected amount of light is no smaller than a selected threshold amount.

5. The system of claim 1, further comprising a receiver of said light connected to said output end of at least one of said first fiber and said second fiber.

6. The system of claim 1, wherein at least one of said first and second magnetostrictive materials is drawn from a group of materials consisting of $Fe_aCo_{1-a}$, ($0 \leq a \leq 1$), Co, Ni, $Fe_bNi_{1-b}$, ($0 \leq b \leq 1$), $(Tb_cDy_{1-c})Fe_2$ ($0 \leq c \leq 1$), $TbFe_2$, $Fe_{0.8}B_{0.2}$, $Fe_{0.4}Ni_{0.4}B_{0.2}$, ceramics of $Fe_3O_4$, $Fe_2NiO_4$, and $Fe_2CoO_4$, and metallic glasses of FeSiB and (FeNi)SiB.

7. The system of claim 1, wherein said magnetic field means provides said magnetic field with said induction strength that is at least sufficient to change said optical coupling length $L_c$ by an amount that is approximately equal to λ/2.

8. The system of claim 1, wherein said magnetic field means provides said magnetic field with said induction strength that is at least sufficient to change said optical coupling length $L_c$ by a selected amount that is approximately equal to χ·λ/2, where k<χ<k+1 and k is a selected integer.

9. The system of claim 1, wherein at least one of said first impressed magnetic induction value and said second impressed magnetic induction value is at least 1 Gauss.

10. The system of claim 1, further comprising a temperature control mechanism, surrounding and controlling a temperature of at least one of said first magnetostrictive material and said second magnetostrictive material.

11. The system of claim 1, wherein at least one of said first and second magnetostrictive materials is drawn from a group consisting of Ni and $Fe_aCo_{1-a}$, where a is a selected value in a range $0 \leq a \leq 1$.

12. A method for controlling light, the method comprising:
    physically coupling first and second optical fibers in a Mach-Zehnder interferometer having a selected length $L_c$, with each fiber having a first end and a second end;
    providing a source of light, including light with a selected wavelength λ, at the first end of the first fiber;
    receiving light at the second end of at least one of the first fiber and the second fiber;

providing a first control structure and a second control structure, surrounding and contiguous to the first and second fibers, respectively, in the physical coupling region, the control structure including respective first and second magnetostrictive materials; and impressing a magnetic field of controllable induction strength on the first magnetostrictive material so that, when the impressed induction has a first selected value, a first selected amount of light is received at the second end of the first fiber, and when the impressed induction has a second selected value, a second selected amount of light is received at the second end of the first fiber;

impressing a second magnetic field of a second controllable induction strength on the second magnetostrictive material so that, when the second impressed induction has a first selected value, a first selected amount of light is received at the second end of the second fiber, and when the second impressed induction has a second selected value, a second selected amount of light is received at the second end of the second fiber; and choosing one of the first magnetostrictive material and the second magnetostrictive material to have a positive magnetostrictive coefficient and choosing the other of the first magnetostrictive material and the second magnetostrictive material to have a negative magnetostrictive coefficient.

13. The method of claim 12, further comprising choosing said first selected amount of light to be substantially no light.

14. The method of claim 12, further comprising choosing at least one of said first selected amount of light and said second selected amount of light is light to be no larger than a selected threshold amount.

15. The method of claim 12, further comprising choosing at least one of said first selected amount of light and said second selected amount of light to be no small er than a selected threshold amount.

16. The method of claim 12, further comprising providing a receiver of said light connected to said output end of at least one of said first fiber and said second fiber.

17. The method of claim 12, further comprising choosing at least one of said first and second magnetostrictive materials from a group of materials consisting of $Fe_aCo_{1-a}$, ($0 \leq a \leq 1$), Co, Ni, $Fe_bNi_{1-b}$, ($0 \leq b \leq 1$), $(Tb_cDy_{1-c})Fe_2$ ($0 \leq c \leq 1$), $TbFe_2$, $Fe_{0.8}B_{0.2}$, $Fe_{0.4}Ni_{0.4}B_{0.2}$, ceramics of $Fe_3O_4$, $Fe_2NiO_4$, and $Fe_2CoO_4$, and metallic glasses of FeSiB and (FeNi)SiB.

18. The method of claim 1, further comprising providing said magnetic field with said induction strength that is at least sufficient to change said optical coupling length $L_c$ by an amount that is approximately equal to $\lambda/2$.

19. The method of claim 12, further comprising providing said magnetic field with said induction strength that is at least sufficient to change said optical coupling length $L_c$ by a selected amount that is approximately equal to $\chi \cdot \lambda/2$, where $k<\chi<k+1$ and k is a selected integer.

20. The method of claim 12, further comprising choosing at least one of said first impressed magnetic induction and said second impressed magnetic induction to have an induction value of at least 1 Gauss.

21. The method of claim 12, further comprising providing a temperature control mechanism, surrounding and controlling a temperature of at least one of said first magnetostrictive material and said second magnetostrictive material.

22. The method of claim 12, further comprising choosing at least one of said first and second magnetostrictive materials from a group consisting of Ni and $Fe_aCo_{1-a}$, where a is a selected value in a range $0 \leq a \leq 1$.

23. A method for controlling light, the method comprising:

physically coupling first and second optical fibers in an optical coupling region having a selected length $L_c$, with each fiber having a first end and a second end;

providing a source of light, including light with a selected wavelength $\lambda$, at the first end of the first fiber;

receiving light at the second end of at least one of the first fiber and the second fiber;

providing a first control structure, surrounding and contiguous to the first and second fibers in the physical coupling region, the control structure including a magnetostrictive material, where the magnetostrictive material is drawn from a group of materials consisting of $Fe_aCo_{1-a}$, ($0 \leq a \leq 1$), Co, Ni, $Fe_bNi_{1-b}$, ($0 \leq b \leq 1$), $(Tb_cDy_{1-c})Fe_2$ ($0 \leq c \leq 1$), $TbFe_2$, $Fe_{0.8}B_{0.2}$, $Fe_{0.4}Ni_{0.4}B_{0.2}$, ceramics of $Fe_3O_4$, $Fe_2NiO_4$, and $Fe_2CoO_4$, and metallic glasses of FeSiB and (FeNi)SiB; and impressing a magnetic field of controllable induction strength on the first magnetostrictive material so that, when the impressed induction has a first selected value, a first selected amount of light is received at the second end of the first fiber, and when the impressed induction has a second selected value, a second selected amount of light is received at the second end of the first fiber.

24. A method for controlling light, the method comprising:

physically coupling first and second optical fibers in an optical coupling region having a selected length $L_c$, with each fiber having a first end and a second end;

providing a source of light, including light with a selected wavelength $\lambda$, at the first end of the first fiber;

receiving light at the second end of at least one of the first fiber and the second fiber;

providing a first control structure, surrounding and contiguous to the first and second fibers in the physical coupling region, the control structure including a first magnetostrictive material; and impressing a magnetic field of controllable induction strength on the first magnetostrictive material, where the induction strength is chosen to change the optical coupling length $L_c$ by a selected amount that is approximately equal to $\chi \cdot \lambda/2$, where $k<\chi<k+1$ and k is a selected integer, thereby providing an amount of light at the second end of the first fiber that is controllably attenuated relative to a maximum amount of light that can be received at the second end of the first fiber.

25. The method of claim 24, further comprising providing said attenuated amount of light at said second end of said first fiber that is approximately equal to $I(max) \cdot \sin^2(\pi \chi/2)$, where I(max) is the maximum amount of light that can be received at said second end of said first fiber.

* * * * *